United States Patent Office 3,644,359
Patented Feb. 22, 1972

3,644,359
FREE-FLOWING CYANURIC ACIDS
Raymond N. Mesiah, Somerset, N.J., and Harold R. Chancey, Charleston, W. Va., assignors to FMC Corporation, New York, N.Y.
No Drawing. Filed May 1, 1970, Ser. No. 33,911
Int. Cl. C07d 55/36
U.S. Cl. 260—248 A  5 Claims

ABSTRACT OF THE DISCLOSURE

Cyanuric acid which has been purified by acid digestion is not free-flowing, and it cakes upon storage. This invention provides a method of making the acid-digested cyanuric acid free-flowing and non-caking.

BACKGROUND OF THE INVENTION

(A) Field of the invention

Our invention provides a method of treating acid-digested cyanuric acid powder by mixing a sufficient amount of ammonia or an alkyl or aryl amine with the cyanuric acid powder so that a 25% slurry of this treated powder in water will have a pH of at least about 3.0 and preferably less than about 7.0.

(B) Description of the prior art

The method usually practiced commercially in producing cyanuric acid is by pyrolysis of urea followed by acid digestion. Unfortunately, the pyrolysis of urea produces numerous undesirable side products along with the cyanuric acid, and there are no commercially practiced methods of controlling the pyrolysis to prevent the formation of undesirable side products. However, the side products made by the pyrolysis of urea can be either converted into cyanuric acid or separated from the cyanuric acid by acid digestion. Therefore, acid digestion of the solids obtained by the pyrolysis of urea increases the yield of cyanuric acid and purifies the cyanuric acid. However, the cyanuric acid so produced is a fine powder which is not free-flowing but cakes upon storage. This invention provides a method of making the acid-digested cyanuric acid powder free-flowing even after it has been stored for extended periods of time.

A method of producing cyanuric acid by the pyrolysis of urea followed by the purification of acid-digesting is disclosed in U.S. Pat. 2,943,088 issued to Richard Westfall on June 28, 1960. This method produces a cyanuric acid powder which is not free-flowing, but cakes upon storage. To make this cyanuric acid powder free-flowing the prior art mechanically agglomerates the powder with rollers; this method is disclosed in U.S. Pat. 3,380,667 issued to Moore et al. on Apr. 30, 1968. Producing free-flowing cyanuric acid by agglomerating the acid-digested cyanuric acid powder substantially increases the particle size of the cyanuric acid product. The principal disadvantage of mechanically agglomerating the cyanuric acid to make it free-flowing is that it requires expensive equipment, which involves high maintenance costs. The powder required for mechanically agglomerating cyanuric acid is also expensive.

Some applications for cyanuric acid require the cyanuric acid to be free-flowing, and in fine powder form. A method making cyanuric acid free-flowing by agglomerating the powder into enlarged particles cannot supply a free-flowing cyanuric acid which is a fine powder.

SUMMARY OF THE INVENTION

We have found a simple and economical method for converting acid-digested cyanuric acid into a free-flowing, finely powdered material by mixing an amount of a nitrogen-containing base such as ammonia, an alkyl amine or an aryl amine with the acid-digested cyanuric acid powder so that a 25% slurry of the treated powder in water has a pH of at least about 3.0 and preferably less than 7.0.

DETAILED DESCRIPTION OF THE INVENTION

Our invention provides a method of treating cyanuric acid which has been produced by the pyrolysis of urea and then purified by acid digestion. Cyanuric acid so produced can be made free-flowing and will not cake during storage if it is treated with the proper amount of a suitable nitrogen-containing base. The preferred nitrogen-containing base is gaseous ammonia, although alkyl amines having 1 to 16 carbon atoms, and aryl amines having 6 to 14 carbon atoms are useful.

The treatment of our invention can be used either immediately after the acid digestion purification step in the manufacture of cyanuric acid by pyrolysis of urea, or as a method of reprocessing cyanuric acid which has become caked during storage.

We have found that when cyanuric acid is produced by pyrolysis of urea followed by acid digestion some of the digesting acid, usually sufuric or hydrochloric acid, remains associated with the cyanuric acid powder despite attempts to remove it. We have discovered that some of the digesting acid remains even after several water washings, although the amount of digesting acid remaining associated with the cyanuric acid powder varies depending on how efficiently the cyanuric acid powder is washed. The amount of digesting acid which normally remains is about 0.15% because repeated washing to obtain substantially lesser amounts of digesting acid residue also results in substantial loss of product because of its solubility in water.

We have discovered that the residual digesting acid causes flow and caking problems associated with acid-digested cyanuric acid powder. We have further discovered that it is possible to chemically treat the cyanuric acid powder and the residual digesting acid to counteract the effect of the latter. This treatment is highly selective, eliminating the adverse influence of the residual digesting acid while essentially not reacting with the cyanuric acid.

The detrimental effects of the residual digesting acid in the cyanuric acid powder can be counteracted by mixing the proper amount of a suitable nitrogen-containing base with the acid-digested cyanuric acid powder without essentially any of the base reacting with the cyanuric acid. This selectivity of the nitrogen-containing base is a very surprising discovery. It is suprising that an acid, namely cyanuric acid, can be treated with the nitrogen-containing base under the conditions of our invention without essentially any of the cyanuric acid reacting with the base, while the base selectively counteracts the detrimental effects of the residual digesting acid.

The cyanuric acid powder is rendered free-flowing by the method of this invention when the amount of base consumed in the treatment is less than the amount of base required to neutralize the digesting acid that remained associated with the cyanuric acid powder after purification and washing. The minimum amount of base that must be consumed to make the cyanuric acid powder free-flowing is at least that amount of base which will cause a 25% slurry of the treated powder in water to have a pH of about 3.0.

When the amount of base consumed during treatment is greater than the minimum amount, the pH of a 25% slurry increases and the selectivity of the treatment decreases. As the amount of base is increased above the minimum, free-flowing product is still obtained, even when the amount of base consumed during treatment causes a 25% slurry of the treated powder in water to have a pH of about 7.0. A greater amount of base than the amount that will cause a 25% slurry to have a pH of about 7.0 will also result in the addition of an excessive amount of nitrogen and neutralization of substantial amounts of cyanuric acid, although the resulting powder is free-flowing and is useful for many purposes, such as making organic derivatives of cyanuric acid.

A major use of powdered cyanuric acid involves further processing into chlorinated derivatives. The presence of nitrogen-containing compounds during the chlorination of cyanuric acid may result in the formation of nitrogen trichloride, which is highly explosive. We have discovered that the amount of nitrogen-containing base consumed in our treatment does not introduce sufficient nitrogen to make chlorination dangerous if the pH of a 25% slurry of the treated powder in water is less than about 7.0 when alkyl or aryl amines are used and less than about 5.0 when ammonia is used and the residual digesting acid after washing the cyanuric acid is less than about 0.25%. However, the preferred amount of base is the minimum amount defined above.

Cyanuric acid powder that has been treated with an amount of base that will cause a 25% slurry in water to have a pH of greater than about 7.0 (5.0 when ammonia is used) is unsuitable for further processing into chlorinated derivatives of cyanuric acid. If after treatment with the nitrogen-containing base, a 25% slurry of the treated powder in water has a pH of greater than about 7.0 (5.0 when ammonia is used) then the powder can be mixed with an amount of untreated or partially treated powder so that the pH of a 25% slurry of the resulting mixture in water is between the pH's of slurries which have been blended. By this means blends whose 25% slurries have pH's within the desired range of about 3.0 to 7.0 can be prepared without having to treat large amounts of acid digested cyanuric acid powder. This resulting mixture or blend will also be free-flowing as was the powder that was treated with an excess of base, and the mixture is suitable for further processing into chlorinated derivatives of cyanuric acid.

The acid-digestion purification step employed in the manufacture of cyanuric acid which was produced by the pyrolysis of urea generally consists of digesting cyanuric acid in a hot digesting acid, usually sulfuric or hydrochloric acid; separating the digesting acid from the purified cyanuric acid solids; and, washing the purified cyanuric acid solids in water to remove the digesting acid. However, some of the digesting acid remains with the purified cyanuric acid powder after washing, the amount depending on the efficiency of the washing step. After the washing of the purified acid-digested cyanuric acid powder, the powder is dried. It is convenient to apply the method of this invention during this drying of the wet, purified cyanuric acid powder by the controlled injection of the nitrogen-containing base directly into the hot gases used in drying the wet, purified cyanuric acid powder. This is the preferred embodiment of our invention along with gaseous ammonia as the preferred nitrogen-containing base.

The method provided by our invention can be carried out either batch-wise or continuously and with either a gaseous nitrogen-containing base, a solution or combinations thereof. When the nitrogen-containing base is gaseous then a suitable gas-solid contacting apparatus is required to practice the invention. There are various types of gas-solid contacting equipment known to the prior art and commercially available any of which may be employed in carrying out the invention. The efficiency with which gas is brought into contact with the powdered cyanuric acid is increased by agitation of the cyanuric acid powder in the gas-solid contacting apparatus. The efficiency is also increased by fine dispersion of the gas. Therefore, available gas-solid contacting apparatus that have the ability to agitate the solids, and have a fine dispersion system for introducing the gas into contact with the solids is preferred in practicing this invention.

When the treatment of this invention is practiced with a nitrogen-containing basic solution, a liquid-solid contacting apparatus is required. The considerations in choosing a liquid-solid contacting apparatus are similar to those enumerated for choosing a gas-solid contacting apparatus. Effective dispersion of the solution and agitation of the cyanuric acid powder is preferred in order to provide proper contact between the basic solution and the cyanuric acid powder.

In practicing this invention it should be remembered that the main rate-controlling factor is the efficiency with which the nitrogen-containing base is brought into contact with the cyanuric acid powder. Therefore, effective dispersion of the nitrogen-containing base and agitation of the cyanuric acid powder increases the rate of production. The temperature at which the treatment provided by our invention is carried out is not critical and operation at normal room temperature is preferred, except when the treatment is combined with the drying of the powder, in which case operation at an elevated temperature, e.g., above about 100° C., is preferred.

Normal atmospheric pressure is the most convenient pressure for carrying out this invention. However, in order to aid the dispersion of gas or the evaporation of moisture, a partial vacuum can be employed in the gas solid contacting apparatus.

Gaseous ammonia is the preferred nitrogen-containing base although a normally gaseous or liquid (room temperature) alkyl amine containing from 1 to 16 carbon atoms or a normally liquid aryl amine containing from 6 to 14 carbon atoms can be used; such as pyridine, piperidene, dibenzylamine, diphenylmethylamine, triethanolamine, monomethylamine, dimethylamine, trimethylamine, monoethylamine, diethylamine, triethylamine, n-butylamine and dioctylamine. When a basic solution or slurry is used, then the treated cyanuric acid powder must be dried following treatment.

All of the bases that can be used contain nitrogen; other bases, such as sodium hydroxide which are applied in solution and which react with the digesting acid to produce water are not suitable except as a supplement to the nitrogen-containing base. The water of neutralization produced by the unsuitable bases has a detrimental effect on the free-flowing properties of the cyanuric acid powder, which effect can not always be eliminated by drying the powder.

Gaseous ammonia is preferred, however solutions of ammonia, an alkyl amine or an aryl amine in solvents such as water, alcohol or the like low-boiling solvents for the base can be used.

The following examples illustrate the method of our invention. These examples are provided by way of illustration only, and are not intended to limit the scope of the invention. All percentages used in the examples are weight percentages. The cyanuric acid feed in Examples 1, 2, and 3 was produced by pyrolysis of urea followed by acid-digestion in hot sulfuric acid. The cyanuric acid powder was washed with water and dried. It was determined that the cyanuric acid powder feed used in all the examples contained 0.18% residual sulfuric acid.

EXAMPLE 1

One hundred grams of the cyanuric acid was placed in a 350 ml. Buchner funnel and covered with a large watch glass. The cyanuric acid caked and was not free-flowing. Dry ammonia gas was passed up through the cyanuric acid for 30 seconds. After the ammonia gas treatment, the cyanuric acid was free-flowing and did not cake on storage. A 25% slurry of the treated cyanuric acid in water had a pH of 6.7 and analysis indicated the treated powder had 0.18% free ammonia, which indicates that the sulfuric acid was neutralized.

EXAMPLE 2

The same procedure was followed as in Example 1 except that the ammonia gas was passed through the cyanuric acid powder for about 25 seconds. After the ammonia gas treatment the cyanuric acid powder was free-flowing and did not cake in storage. A 25% slurry of the treated powder in water had a pH of 5.6 and analysis indicated the treated powder had 0.014% free ammonia, which indicates that the sulfuric acid was neutralized.

EXAMPLE 3

The same procedure was followed as in Example 1 except that the ammonia gas was passed through the cyanuric acid powder for about 20 seconds. After the ammonia gas treatment, the cyanuric acid was free-flowing and did not cake in storage. A 25% slurry of the treated powder in water had a pH of 3.45. Analysis indicated that there was no free ammonia in the treated cyanuric acid but that the sulfuric acid content had decreased from 0.18 to 0.015%.

EXAMPLE 4

A large sample of crude cyanuric acid which contained 80% cyanuric acid and 20% ammelide was purified by heating in 15% sulfuric acid for several hours at reflux temperature (103° C.). The mixture was centrifuged to separate the solids from the sulfuric acid solution and the solids were washed with water. After washing, the solids were analyzed for their water and sulfuric acid contents, which were 7.0% water and 0.15% sulfuric acid.

(A) COMPARATIVE EXAMPLE

One-half of the solids was dried to give a product which analyzed 0.1% water and 0.16% sulfuric acid, and which was initially free-flowing but after about two weeks storage caked badly.

(B) THIS INVENTION

The other half of the wet solids was dried with hot gas in which 0.003 pound of ammonia was injected into the hot gas per pound of cyanuric acid being dried. The dried cyanuric acid was very free-flowing even after storage for six months under the same conditions as the Comparative Example A material was stored. A 25% slurry of the treated cyanuric acid in water had a pH of 3.7.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practicad by those skilled in the art, and having the benefit of this disclosure, otherwise than as specifically described and exemplified herein.

What is claimed is:

1. A method of treating acid-digested cyanuric acid powder to render it free-flowing and non-caking, comprising treating the acid-digested cyanuric acid powder with an amount of a nitrogen-containing base selected from the group consisting of ammonia, normally gaseous or liquid alkyl amine containing from 1 to 16 carbon atoms and normally liquid aryl amine containing from 6 to 14 carbon atoms, to provide a treated cyanuric acid powder which when mixed with water forms a 25% solid slurry having a pH of at least 3.0.

2. The method of claim 1 further comprising, drying the acid-digested cyanuric acid with a heated gas, and wherein the treating of the acid-digested cyanuric acid powder with the nitrogen-containing base is carried out during said drying of the acid-digested cyanuric acid by introducing the nitrogen-containing base with the heated gas to be used for drying.

3. The method of claim 2 wherein the nitrogen-containing base is gaseous ammonia and the pH of the 25% slurry is between 3.0 and 5.0.

4. The method of claim 2 wherein the nitrogen-containing base is a normally gaseous or liquid alkyl amine containing from 1 to 16 carbon atoms and the pH of the 25% slurry is between 3.0 and 7.0.

5. The method of claim 2 wherein the nitrogen-containing base is a normally liquid aryl amine containing from 6 to 14 carbon atoms and the pH of the 25% slurry is between 3.0 and 7.0.

References Cited

UNITED STATES PATENTS 3,297,697    1/1967    Reynolds et al. _____ 260—248

JOHN M. FORD, Primary Examiner